May 14, 1940.  V. W. FARRIS  2,200,878
CLUTCH-OPERATED CONTROL
Filed Oct. 21, 1938
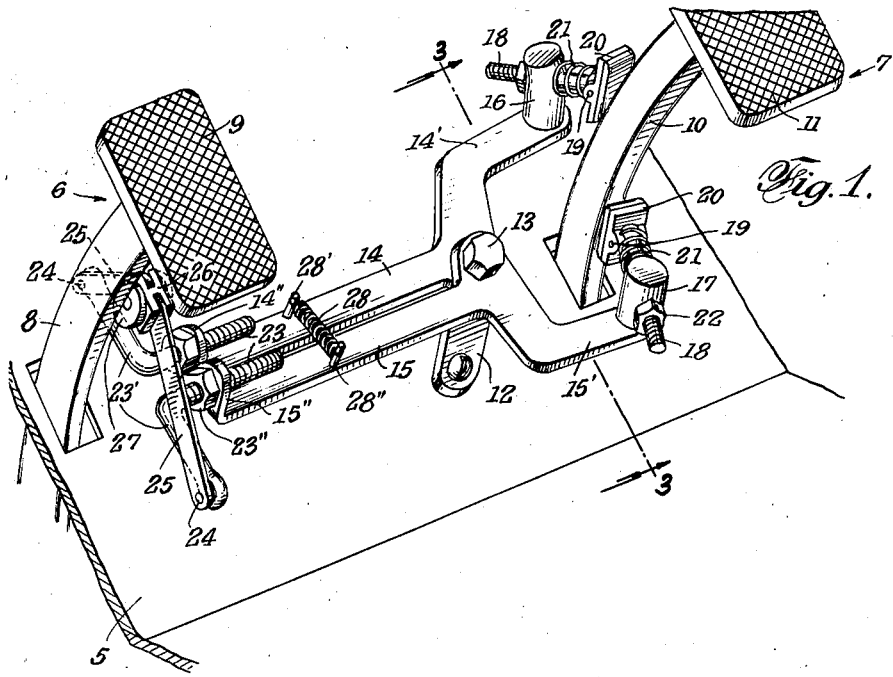
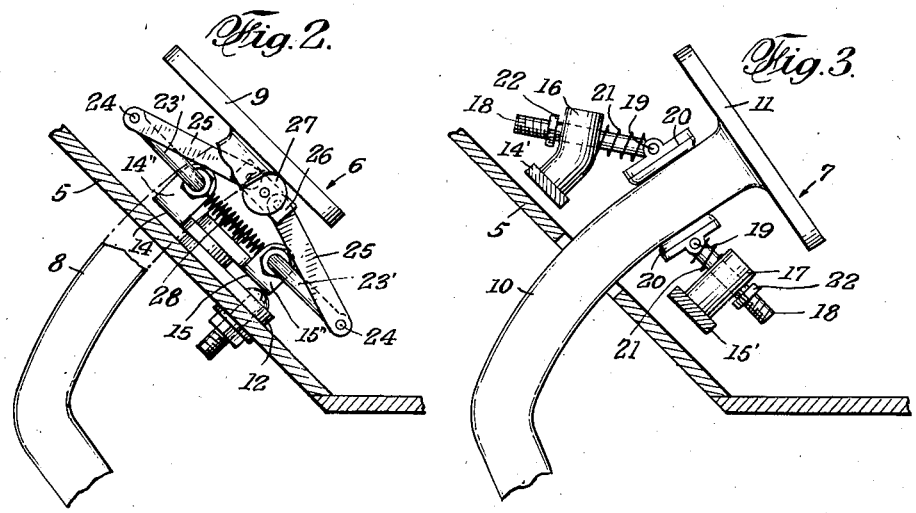
INVENTOR
VICTOR W. FARRIS
BY
ATTORNEYS Patented May 14, 1940

2,200,878

UNITED STATES PATENT OFFICE 2,200,878

CLUTCH-OPERATED CONTROL

Victor W. Farris, New York, N. Y.

Application October 21, 1938, Serial No. 236,209

5 Claims. (Cl. 192—13)

My present invention relates to brake controls for motor vehicles, and more particularly to a device of the general character indicated which is adapted to be controlled by the clutch pedal of the vehicle, and aims to provide a clutch-operated brake control which is simple in construction, easy and economical to fabricate and assemble, and admirably adapted to perform the intended functions as hereinafter more fully set forth.

In the accompanying specification, I shall describe and in the annexed drawing show an illustrative embodiment of the device of the present invention. It is however to be clearly understood that I do not wish to be limited to the exact details herein shown and described for purposes of illustration only for the reason that changes may be made therein without the exercise of the inventive faculties and within the scope of the claims hereto appended.

Before describing my invention in detail, I deem it advisable briefly to refer to the prior art in the field to which the present invention relates, to point out the disadvantages thereof and the manner in which the present invention overcomes and eliminates the same.

All drivers of motor vehicles are aware of the difficulty in starting forwardly when the vehicle is parked on an upward grade, such as occurs very often when waiting for a change in traffic controls. In order to prevent the vehicle from rolling backward, it is necessary to either keep the foot brake depressed or apply the handbrake. If the former method is used, there is usually a difficulty in transferring the operator's right foot from the brake pedal to the accelerator as the clutch is being let out to start forward. The result is a rolling backward, to some extent, with the danger of injury to the rear end and other parts of the vehicle due to the jerk brought about when the clutch is finally engaged.

If the handbrake is used, considerable skill is required to time the releasing of the handbrake with the operation of the accelerator, and in the case of a person whose arm is not of sufficient length, this timing becomes even more difficult.

By means of the present invention, I overcome these disadvantages by providing a simple accessory which can be installed very simply and without any difficulty and which is designed to be operated by the clutch pedal to maintain the foot brake in whatever position it has been placed during the stopping of the vehicle, thus leaving the right foot free to operate the accelerator, the brake being automatically released when the clutch pedal is raised preparatory to starting forward again.

In the accompanying drawing, Fig. 1 is a perspective view of a portion of the floorboard of a motor vehicle showing the clutch and brake pedals with the accessory of the present invention associated therewith.

Fig. 2 is an end view of the same looking from the left in Fig. 1 with the clutch pedal depressed to operate the accessory; and Fig. 3 is a transverse sectional view taken on line 3—3 of Fig. 1 showing the manner in which the brake pedal is gripped when the device is in operation.

Referring now more in detail to the aforesaid illustrative embodiment of the present invention and with particular reference to the drawing illustrating the same, the numeral 5 designates the floorboard of a motor vehicle provided with openings through which extend the clutch pedal 6 and the brake pedal 7, the pedals respectively comprising the lever 8 and footpad 9 and the lever 10 and footpad 11. Secured to the floorboard intermediate the pedals 6 and 7 is an arm 12 carrying a bolt 13 upon which is pivotally mounted a pair of levers 14 and 15. These levers are provided with offset portions 14' and 15', the former being provided with a post 16, the upper end of which is disposed at an angle of 45° to the vertical, and the latter being provided with a straight post 17. Slidably mounted in the posts 16 and 17 are rods 18, the inner ends of which have pivotally mounted thereon, as at 19, pads 20 adapted to abut the front and rear edges of the lever 10 of the brake pedal 7, the rods being normally urged toward each other by means of the springs 21 and the inward movement of the rods being limited by the adjusting lock nuts 22.

If desired, the pad so adapted to contact the front edge of the lever 10 may be replaced with a roller (not shown) and while I prefer that the post 16 have its upper end disposed at an angle of 45° to the vertical in order to permit freer operation of the foot brake when the control is not set, this is not essential.

The opposite ends of the levers 14 and 15 are provided with upstanding flanges 14" and 15" the flanges being threaded to receive rods 23, the outer ends of which are bent at right angles, as at 23', and are pivotally affixed, as at 24, to links 25. In addition, the rods 23 are provided with lock nuts 23" so that after the rods 23 are adjusted to their proper positions in the flanges 14" and 15", depending upon the distance between the pedals 6 and 7, they may be locked in place. The upper ends of the links are pivotally secured to a central link 26, which preferably carries a pair of rollers 27 adapted, as will hereinafter be more fully described, to be engaged by the underside of the pad 9 of the clutch pedal 6.

The levers 14 and 15 are normally maintained in the position shown in Fig. 1 of the drawing by means of the tension spring 28, the ends of which are fixed to the levers 14 and 15 through pins 28' and 28".

This completes the description of the aforesaid illustrative embodiment of the present invention, and its mode of operation and use may be briefly summarized as follows:

In securing the device to the floorboard, it is positioned so that the rollers 27 are disposed beneath the pad 9 of the clutch pedal 6 and the pads 20 are disposed adjacent the front and rear edges of the lever 10 of the brake pedal 7. In view of the pivotal mounting through the arm 12, the device tends to position itself into proper association with the pedals 6 and 7. With the device in this position the brake may be freely used without any effect thereon by the control of the present invention and with the device in its normal position the clutch pedal 6 may be operated without any effect on the brake as long as the pad 9 is not depressed to such an extent that it engages the rollers 27, it being intended that the device, when installed, be so positioned as to permit sufficient depression of the clutch pedal 6 to disengage the clutch without coming into contact with the rollers. However, should the clutch pedal be depressed a distance more than sufficient to merely disengage the clutch so that the control of the present invention is brought into operation, no harm will be done thereby for the reason that the brake is not actually operated by the device of the present invention but is only held in whatever its then position may be at the time that the control grips it. Furthermore, even after the lever 10 has been engaged by the pads 20, the brake pedal 7 can still be depressed if it is found that the prior operation of the brake has given insufficient brakeage and this may be accomplished without the necessity of first releasing the clutch of pedal 6.

Assuming that it is desired to stop the vehicle on an upgrade, as usual, the operator will first depress the brake pedal 7 and immediately before the vehicle comes to a complete stop, he will depress the clutch pedal 6. The depression of the clutch pedal to a certain level will have the effect of only disengaging the clutch. By continuing the depression closer to the floorboard the rollers 27 are engaged by the underside of the pad 9 to operate, through the links 25, the levers 14 and 15, against the tension of the spring 28. This operation of the levers 14 and 15 will move the jaws or pads 20 toward each other so as to contact and grip there-between the lever 10 of the brake pedal 7. As long as the pads 20 remain in this position the brake will be retained in whatever position it was in immediately prior to the operation of the control. Thus, if the brake had been depressed, as in the case being described it will remain in this position and the operator's right foot may be removed so as to leave it free to operate the accelerator when it is desired to start again. It should be noted that very little pressure in excess of that necessary to the normal operation of the clutch pedal is needed to main the device in an operative position for the reason that the links 25 assume an almost straight position respecting each other and so absorb a good deal of the tension of the spring 28. When it is desired to start again, all that is necessary is to slowly raise the clutch pedal 6. The first upward movement of the clutch will, because of the tension of the spring 28, operate the levers 14 and 15 to remove the pads 20 from their gripping engagement of the lever 10 of the pedal 7 thus permitting the latter to return to its normal, disengaged, upward position. Of course, simultaneously the operator's right foot will have been operating the accelerator to feed the motor, and as the clutch pedal 6 is permitted to continue its upward movement, the clutch will become engaged and the vehicle gotten under way.

The device is fool proof in that if the clutch is depressed first so that the pads have already engaged the lever 10 of the brake pedal 7, the latter may still be operated in view of the pivotal connection between the pads 20 and the rods 18 and the sliding of the rods 18 in their posts 16 and 17.

This completes the description of the mode of operation and use of the device of the present invention.

From the foregoing it will be seen that I have provided a means for controlling the brake pedal of a motor vehicle, to be operated by the clutch pedal, which is simple in construction, easy and economical to fabricate and assemble, and admirably adapted to perform the intended function.

Other objects and advantages of the present invention will be obvious to those skilled in the art to which the present invention relates.

What I claim as my invention is:

1. In combination with the clutch and brake pedals of a motor vehicle, a pair of jaws adapted to grip the brake pedal and hold the same in its then position, said jaws being pivotally mounted on a common pivot point, and means operated by the clutch pedal to actuate said jaws.

2. In combination with the clutch and brake pedals of a motor vehicle, a pair of jaws adapted to grip the brake pedal and hold the same in its then position, a pair of levers floatingly mounted on a common pivot point to carry said jaws and move the same into and out of their gripping position, and means operated by the clutch pedal to actuate the said jaws through said levers.

3. In combination with the clutch and brake pedals of a motor vehicle, a pair of jaws adapted to grip the brake pedal and hold the same in its then position, said jaws being pivotally mounted on a common pivot point, and link connections operated by the clutch pedal to actuate the said jaws.

4. In combination with the clutch and brake pedals of a motor vehicle, a pair of jaws adapted to grip the brake pedal and hold the same in its then position, a pair of levers floatingly mounted on a common pivot point to carry said jaws and move the same into and out of their gripping position, and link connections, operated by the clutch pedal, to actuate said jaws through said levers.

5. In combination with the clutch and brake pedals of a motor vehicle, a suporting arm pivoted to the floorboard of a the vehicle a pair of levers pivotally mounted on said arm on a common pivot point, means carried at the ends of said levers to engage the brake pedal and hold the same in its then position, and means, associated with the other ends of said levers, operated by the depression of the clutch pedal, to actuate said first named means, through said levers.

VICTOR W. FARRIS.